United States Patent
Song et al.

(10) Patent No.: US 12,436,321 B2
(45) Date of Patent: Oct. 7, 2025

(54) LENS MODULE WITH FINELY-ADJUSTABLE APERTURE AND ELECTRONIC DEVICE

(71) Applicant: TRIPLE WIN TECHNOLOGY (SHENZHEN) CO. LTD., Shenzhen (CN)

(72) Inventors: Jian-Chao Song, Guangdong (CN); Wu-Tong Wang, Jincheng (CN); Kun Li, Jincheng (CN); Yu-Shuai Li, Shenzhen (CN)

(73) Assignee: TRIPLE WIN TECHNOLOGY (SHENZHEN) CO. LTD., Shenzhen (CN)

( * ) Notice: Subject to any disclaimer, the term of this patent is extended or adjusted under 35 U.S.C. 154(b) by 479 days.

(21) Appl. No.: 17/988,615

(22) Filed: Nov. 16, 2022

(65) Prior Publication Data

US 2024/0061156 A1    Feb. 22, 2024

(30) Foreign Application Priority Data

Aug. 16, 2022    (CN) .......................... 202210982010.4

(51) Int. Cl.
    *G02B 5/00*    (2006.01)
(52) U.S. Cl.
    CPC .................... *G02B 5/005* (2013.01)

(58) Field of Classification Search
    CPC ........... G02B 5/005; G03B 9/06; G03B 30/00
    See application file for complete search history.

(56) References Cited

U.S. PATENT DOCUMENTS

2020/0301247 A1* 9/2020 Uno ......................... G03B 9/06
2022/0382128 A1* 12/2022 Lee ......................... G03B 9/02

FOREIGN PATENT DOCUMENTS

CN    114827483 A    7/2022

* cited by examiner

*Primary Examiner* — Mariam Qureshi
(74) *Attorney, Agent, or Firm* — ScienBiziP, P.C.

(57) ABSTRACT

A lens module with light-passing hole which is finely adjustable in size includes a lens and aperture assembly. The aperture assembly includes cover body, driving member, rotating disk, and light-blocking blades. The cover body is outside the lens and defines a first aperture. The rotating disk is on the cover body and defines a second and adjustable aperture. The blades are between the cover body and rotating disk, each blade comprising a side surface and the plurality of blades work together to form a light-passing hole. The rotating disk is driven to rotate by the driving member, the blades thereby moving closer to or away from each other, to adjust an aperture of the lens module. The present disclosure further provides an electronic device.

14 Claims, 8 Drawing Sheets

LENS MODULE WITH FINELY-ADJUSTABLE APERTURE AND ELECTRONIC DEVICE

FIELD

The subject matter herein generally relates to imaging, and more particularly, to a lens module and an electronic device.

BACKGROUND

An electronic device may include a lens module that can capture images. An aperture is provided on the lens module, the aperture can guide light into the lens module. A size of the aperture may affect the quality of the images. A lens module with a large aperture has a shallow depth of field, which can blur the background and highlight an object in the foreground, and the imaging effect is good. A lens module with a small aperture can be used to capture images with a deep depth of field, such as vehicle tracks and star trails, and obtain clear images of objects in multiple depth-of-field ranges.

The lens module may have a plurality of gears that can adjust the aperture size. However, the user can only adjust the aperture size in certain size-steps because of the limited quantity of gears, so that the aperture size is also limited, thus affecting the user experience. Therefore, there is a room for improvement in the art.

BRIEF DESCRIPTION OF THE DRAWINGS

Implementations of the present technology will now be described, by way of example only, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale, and the proportions of certain parts may be exaggerated to better illustrate details and features of the present disclosure.

The term "comprising," when utilized, means "including, but not necessarily limited to"; it specifically indicates open-ended inclusion or membership in the so-described combination, group, series, and the like.

Some embodiments of the present disclosure will be described in detail with reference to the drawings. If no conflict, the following embodiments and features in the embodiments can be combined with each other.

Figure 1:
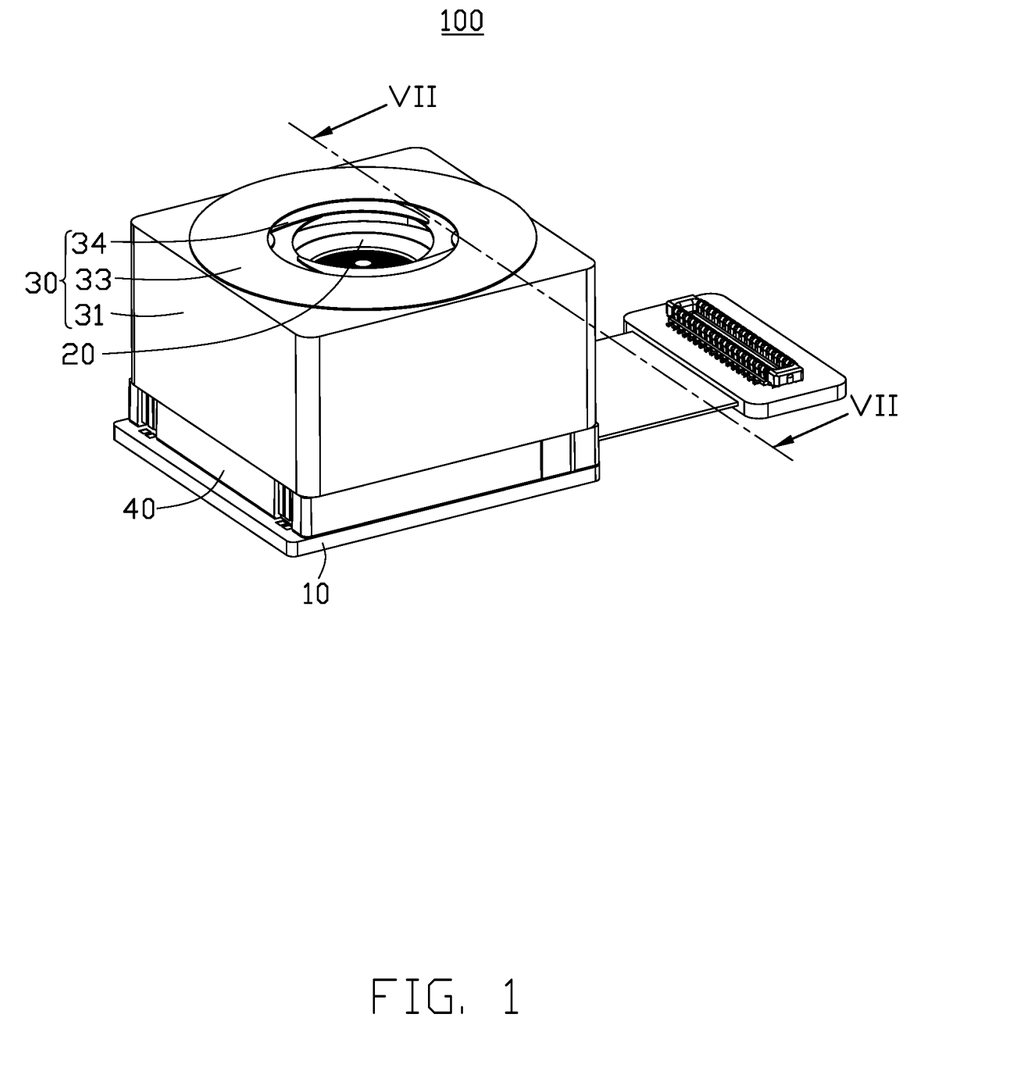
FIG. 1 is a diagrammatic view of an embodiment of a lens module according to the present disclosure.
Figure 2:
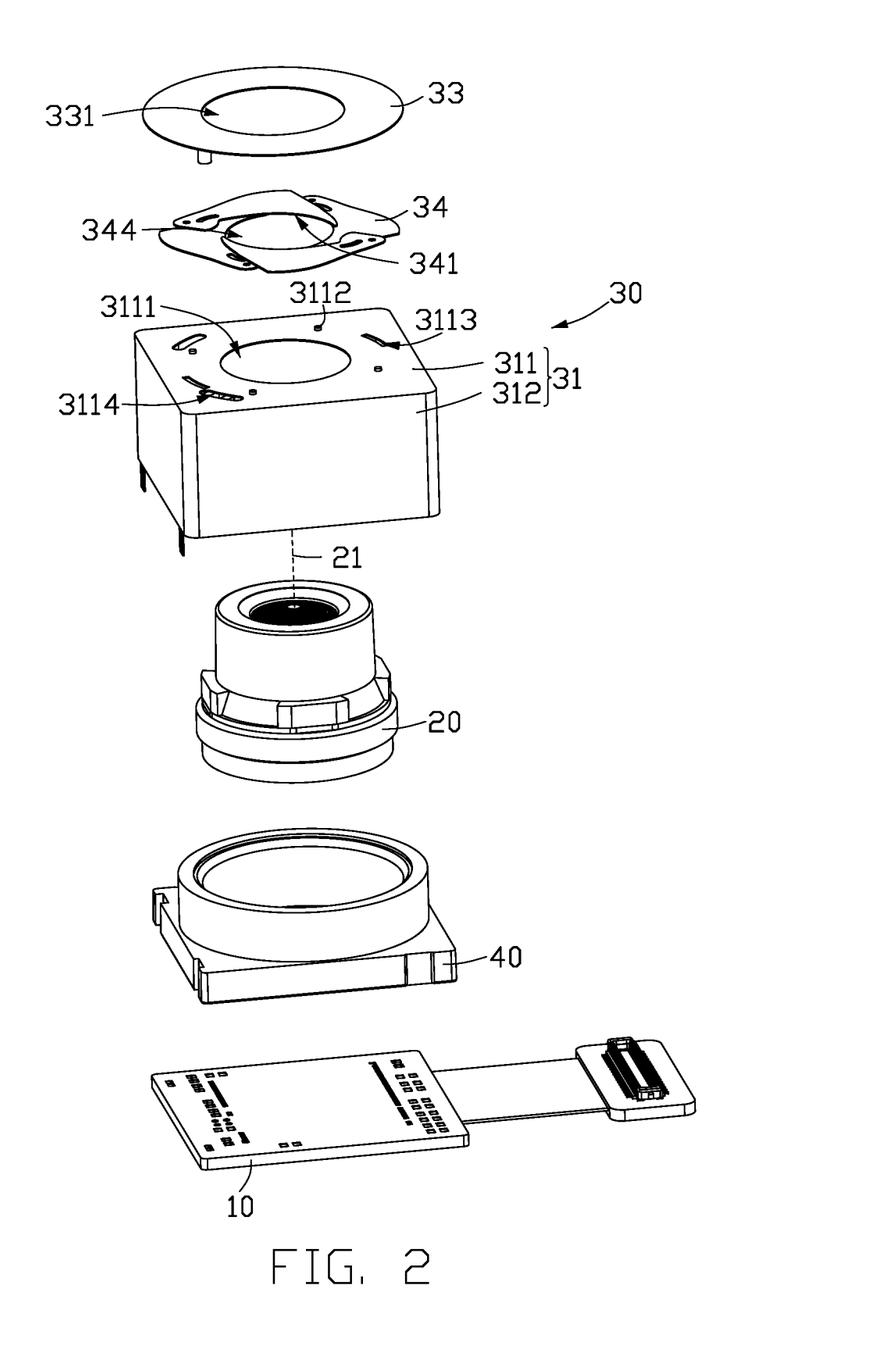
FIG. 2 is an exploded view of the lens module of FIG. 1.

Referring to FIGS. 1 and 2, a lens module 100 is provided according to an embodiment of the present disclosure. The lens module 100 includes a circuit board 10, a lens 20, and an aperture assembly 30. The lens 20 is disposed on the circuit board 10. There is an optical axis 21 of the lens 20. The aperture assembly 30 includes a cover body 31, a driving member 32, a rotating disk 33, and a plurality of blades 34. The cover body 31 is sleeved on the lens 20. The cover body 31 includes a top plate 311. The rotating disk 33 is disposed on the top plate 311. The blades 34 are disposed between the top plate 311 and the rotating disk 33 and are connected to the rotating disk 33. A first optical hole 3111 is defined on the top plate 311, and a second optical hole 331 is defined on the rotating disk 33. A central axis of the first optical hole 3111 and a central axis of the second optical hole 331 are aligned with the optical axis 21.

Figure 3:
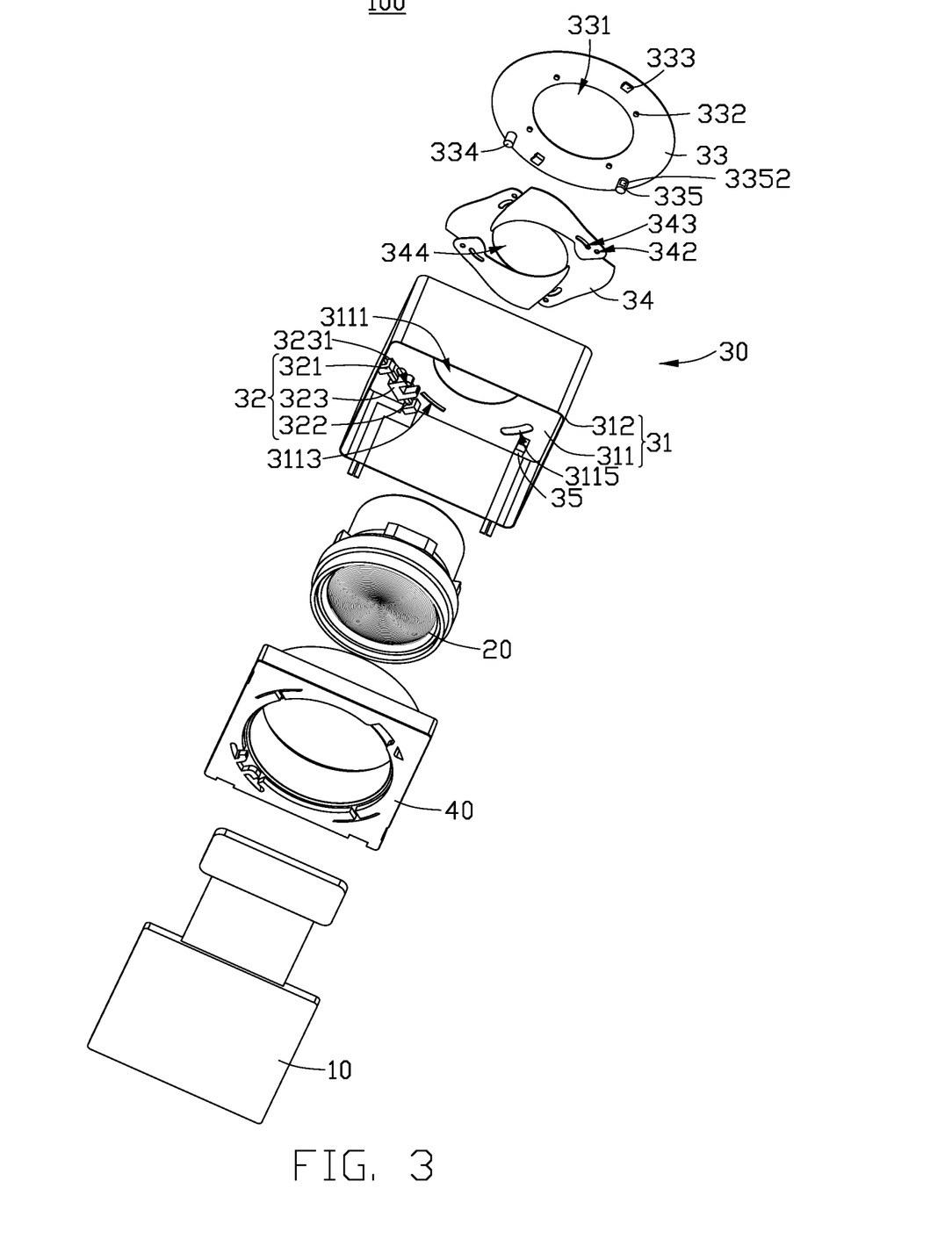
FIG. 3 is similar to FIG. 2, but showing the lens module from another angle.

Referring to FIGS. 2 and 3, each blade 34 includes a side surface 341. The side surfaces 341 of the blades 34 cooperatively define a light-passing hole 344. A central axis of the light-passing hole 344 is aligned with the optical axis 21. Ambient light enters the lens 20 through the second optical hole 331, the light-passing hole 344, and the first optical hole 3111 in sequence. The driving member 32 is disposed on the top plate 311. The driving member 32 is connected to the rotating disk 33, and drives the rotating disk 33 to rotate, thereby driving the blades 34 to move closer to or away from each other, so the side surfaces 341 also move closer to or away from each other. Thus, an amount of light passing through the light-passing hole 344 is changed. The size of the light-passing hole 344 can be adjusted arbitrarily to precisely adjust the amount of light passing through the light-passing hole 344 as needed, so as to adjust an aperture of the lens module 100, which improves the user experience.

Figure 4:
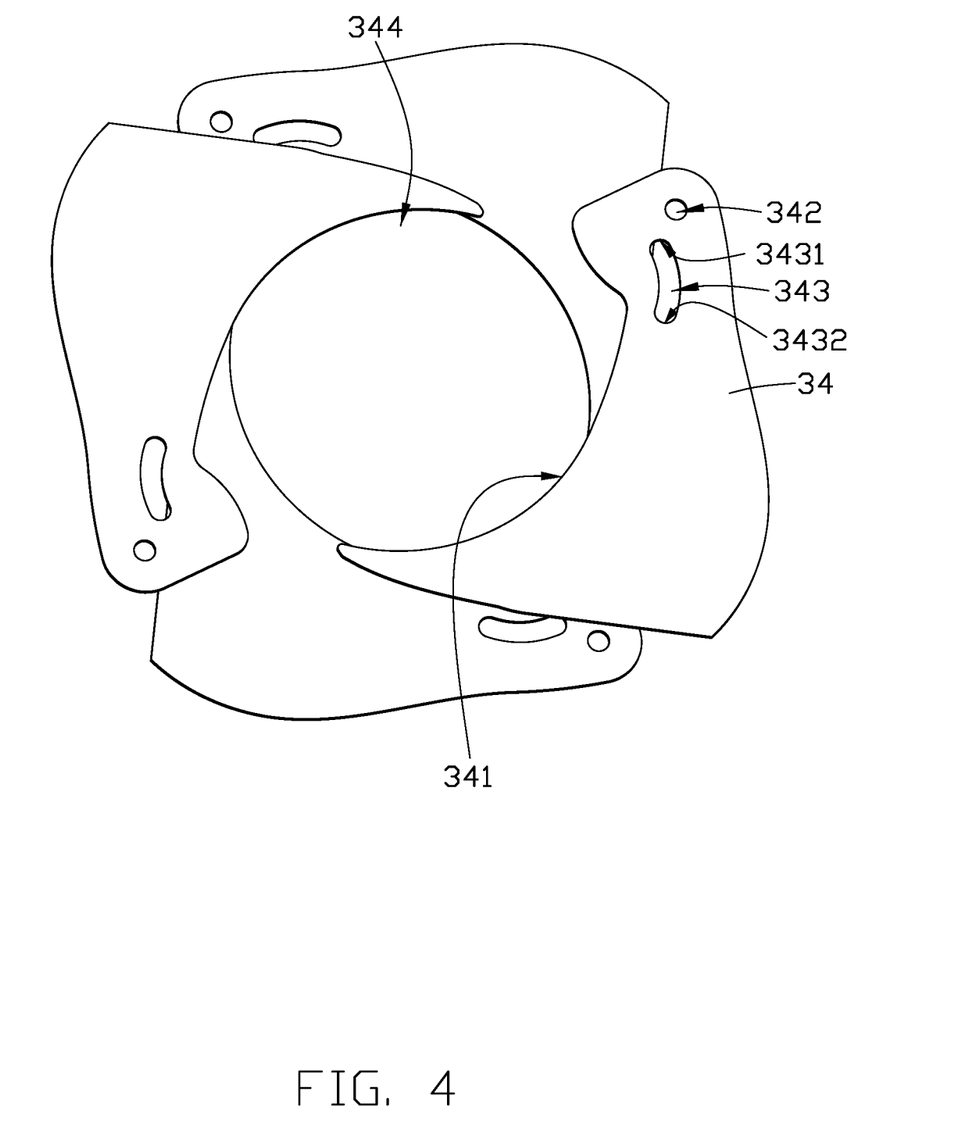
FIG. 4 is a diagrammatic view of blades of the lens module of FIG. 3.

Referring to FIGS. 3 and 4, a through hole 342 and a groove 343 are defined on each of the blades 34. Rotating columns 3112 are provided on a surface of the top plate 311 facing the blades 34, and each of the rotating columns 3112 passes through each through hole 342. Guiding posts 332 are disposed on the rotating disk 33 and surround the second optical hole 331. Each guiding post 332 is accommodated in the groove 343 and can move within the groove 343. The blades 34 are rotatably connected to the top plate 311 through the corresponding rotating columns 3112 and the through holes 342. The blades 34 are connected to the rotating disk 33 through the cooperation of the guiding posts 332 and the grooves 343. Thereby, the blades 34 are assembled between the top plate 311 and the rotating disk 33. The driving member 32 drives the rotating disk 33 to rotate, so that the rotating disk 33 drives the blades 34 to rotate through the relative movement of the guiding posts 332 and the grooves 343. Since the rotating column 3112 passes through the through hole 342, the blades 34 rotates around the rotating column 3112, so that the blades 34 are moved closer to or away from each other, thereby changing the size of the light-passing hole 344.

Referring to FIGS. 3 and 4, in the embodiment, each side surface 341 is arc-shaped. The light-passing hole 344 defined by the side surfaces 341 is substantially circular, so as to improve the uniformity of the light distribution after entering the lens 20, thereby improving the imaging quality. In some embodiments, the number of blades 34 may be four, six, eight, or twelve, etc. In the embodiment, four blades 34 are symmetrically disposed in pairs around the optical axis 21.

Figure 5:
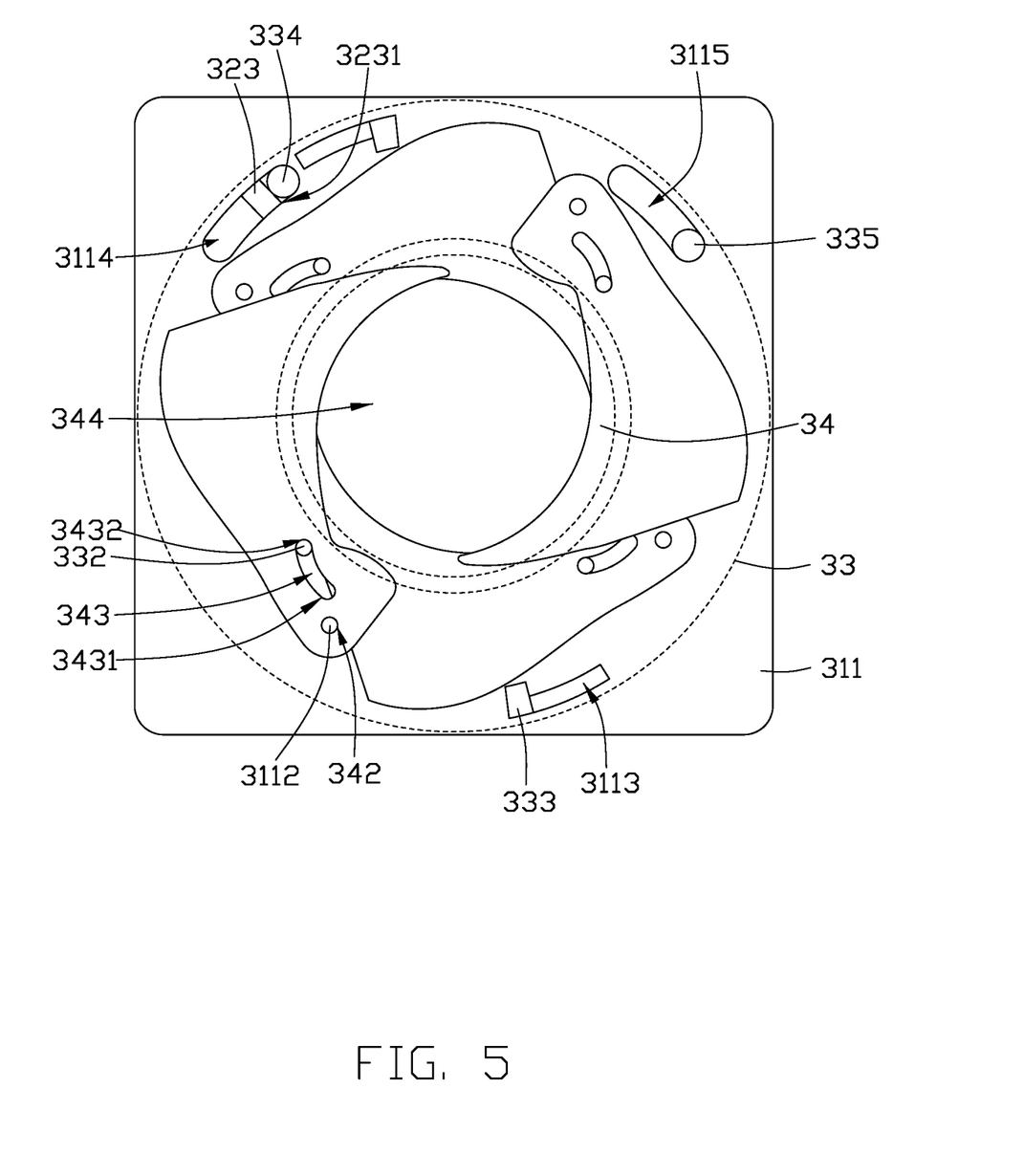
FIG. 5 is a diagrammatic view showing a driving member driving the blades of FIG. 4 to move away from each other.
Figure 6:
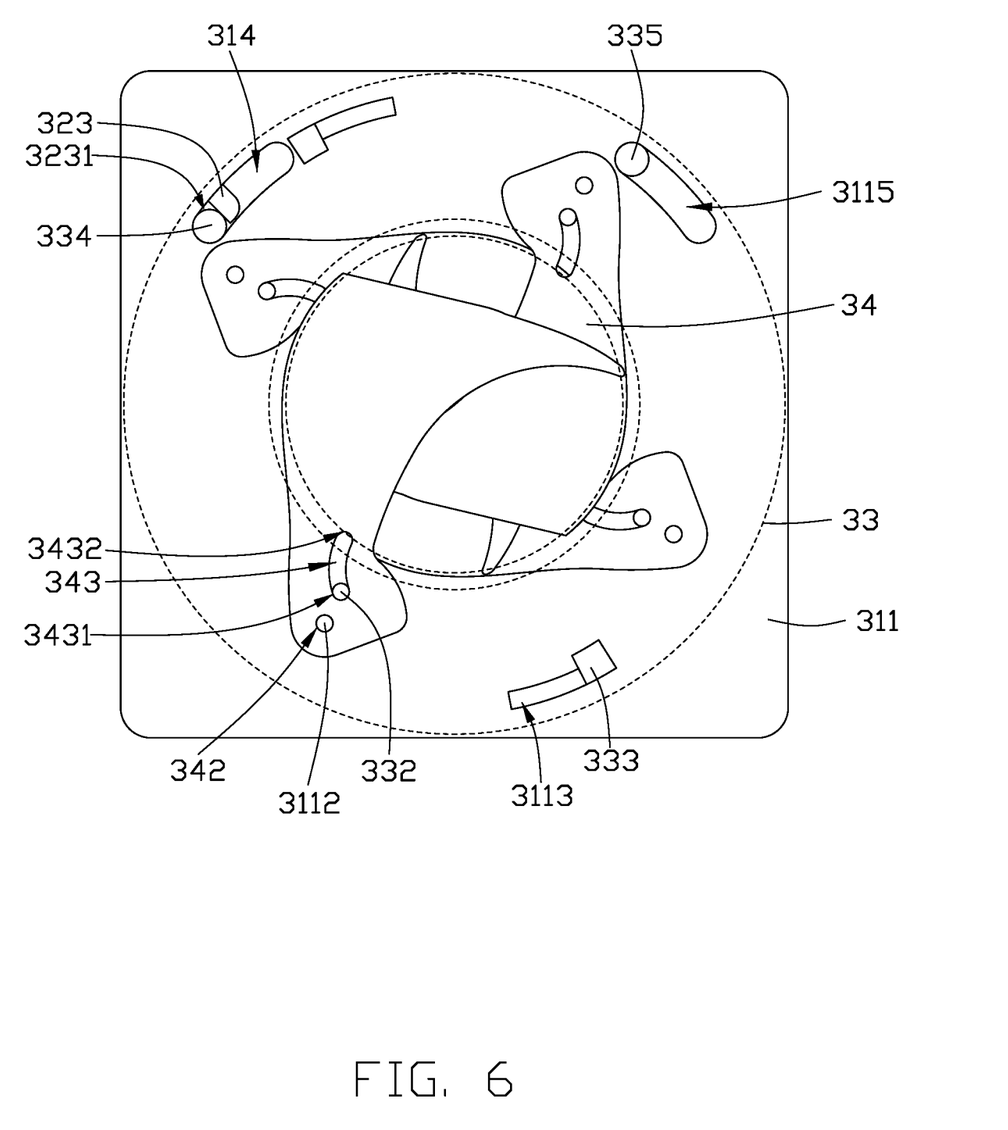
FIG. 6 is a diagrammatic view showing a driving member driving the blades of FIG. 4 to move closer to each other.

Referring to FIGS. 5 and 6, each groove 343 is substantially arc-shaped. Each groove 343 includes a first end 3431 and a second end 3432 opposite to the first end 3431. The first end 3431 is an end closest to the through hole 342, and the second end 3432 is furthest from the through hole 342. When the guiding posts 332 are disposed in the second end 3432, an amount of light passing through the light-passing hole 344 is at minimum, the aperture of the lens module 100 is at a maximum. That is, the four side surfaces 341 of the four blades 34 are far away from each other and enclose an approximately circular light-passing hole 344. At this time, the amount of light passing through the lens module 100 is at maximum, the aperture of the lens module 100 is at a minimum. When the guiding posts 332 move from the second end 3432 to the first end 3431, the amount of light passing through the light-passing hole 344 gradually decreases, the aperture of the lens module 100 gradually increases. When the guiding posts 332 are disposed in the first end 3431, the amount of light passing through the light-passing hole 344 is at minimum, the aperture of the lens module 100 is at a maximum. That is, the four blades 34 are moved closer to and overlapped with each other, completely covering the lens 20, and prevented the ingress of any light.

Referring to FIGS. 3 and 4, in some embodiments, one end of the blade 34 is sharp and knife-shaped, not only reducing a weight of the blade 34 to reduce a weight of the lens module 100 itself, moreover, when the blades 34 rotate around the rotating column 3112, a force of the driving member 32 to drive the blades 34 can also be reduced, thereby reducing energy consumption.

Referring to FIGS. 2 and 3, in some embodiments, the rotating disk 33 includes a buckle 333. A mounting groove 3113 is defined on the top plate 311 for mounting the buckle 333. The mounting groove 3113 is concentric with the first optical hole 3111. The arc-shaped buckle 333 can be rotatably connected in the mounting groove 3113 to realize rotational connection between the rotating disk 33 and the top plate 311. In some embodiments, there are two sets of buckles 333, symmetrically disposed around the center line of the second optical hole 331, so as to improve a rotational stability of the rotating disk 33.

Referring to FIGS. 2 and 3, in some embodiments, the cover body 31 further includes a main body 312, and the top plate 311 is disposed on the main body 312. An outline of the cover body 31 may be approximately cubic. The driving member 32 is disposed on a surface of the top plate 311 facing away from the rotating disk 33. The driving member 32 includes two piezoelectric blocks 321 and a movable shaft 322 disposed between the two piezoelectric blocks 321, the movable shaft 322 being connected to the rotating disk 33. When the two piezoelectric blocks 321 are deformed by a voltage, the movable shaft 322 will be driven to slide along a length direction of the movable shaft 322, thereby driving the rotating disk 33 to rotate. Specifically, a periodically changing voltage can be applied to the two piezoelectric blocks 321, so that the two piezoelectric blocks 321 alternate between shrinking and expanding, thereby driving the movable shaft 322 to move. Compared with using an electric induction magnet as a driving method for driving the blades 34 to rotate, the two piezoelectric blocks 321 can reduce the size of the driving member 32, which allows the entry of more light and also allows a thinner lens module 100.

Referring to FIGS. 5 and 6, in some embodiments, a transmission block 323 is sleeved on the movable shaft 322, and the transmission block 323 is movably connected to the movable shaft 322. A gap 3231 is defined on the transmission block 323, and the transmission block 323 is substantially "U" shaped. A transmission column 334 is disposed on a surface of the rotating disk 33 facing the top plate 311. A communicating groove 3114 is defined on the top plate 311. The communicating groove 3114 is arc-shaped and concentric with the first optical hole 3111. The transmission column 334 passes through the communicating groove 3114 and is clamped in the gap 3231, the communicating groove 3114 being substantially arc-shaped. When the voltage is performed on the two piezoelectric blocks 321, the two piezoelectric blocks 321 exert a force on the movable shaft 322. When the movable shaft 322 moves, if the force exerted by the two piezoelectric blocks 321 on the movable shaft 322 is less than a friction force between the movable shaft 322 and the transmission block 323, it is the transmission block 323 which is moved by the movable shaft 322 and the rotating disk 33 is rotated through the transmission column 334, so as to realize rotation of the blades 34. With a different voltage, if the force exerted by the two piezoelectric blocks 321 on the movable shaft 322 is greater than the frictional force between the movable shaft 322 and the transmission block 323, only the movable shaft 322 is moved to realize reset of the movable shaft 322. The transmission block 323 stops moving, and the transmission block 323 remains in the original state and does not move, so that the rotating disk 33 and the blades 34 maintain the existing rotated state. That is, the size of the light-passing hole 344 at the time is maintained. The size of the light-passing hole 344 by the two piezoelectric blocks 321 is achieved through the above two operation steps.

When the aperture is adjusted to a set size, the driving member 32 stops driving, and power to the two piezoelectric blocks 321 can be shut off, the aperture will remain in the state of the aperture size previously set. Not only is energy consumption reduced, but also a heating generated by the existing electromagnet control is avoided.

Referring to FIGS. 2 and 3, in some embodiments, a position detector 35 is further provided on the surface of the top plate 311 facing away from the rotating disk 33. A positioning column 335 is disposed on the rotating disk 33, a positioning groove 3115 is defined on the top plate 311 for the positioning column 335 to pass through, and the positioning column 335 is rotatably connected in the positioning groove 3115. An induction magnet 3352 is embedded in the positioning column 335. In some embodiments, the position detector 35 is a Hall element. When the rotating disk 33 drives the blades 34 to rotate, the positioning column 335 slides in the positioning groove 3115, and the position detector 35 can obtain information as to the position of the movable shaft 322 and the transmission block 323 by sensing positions of the induction magnet 3352, so that the driving member 32 can precisely control the movements of the rotating disk 33 and the blades 34.

In some embodiments, the two piezoelectric blocks 321 and the position detector 35 are all electrically connected to circuit board 10. The circuit board 10 controls the two piezoelectric blocks 321 to drive the movement of the movable shaft 322 and the transmission block 323, and the position detector 35 feeds back the positional information of the movable shaft 322 and the transmission block 323 to the circuit board 10. In order for the circuit board 10 to control whether the driving member 32 is further actuated, the driving member 32 can control the size of the light-passing hole 344 with high precision, so that the circuit board 10 can control the driving member 32 moving further or moving less, so that the driving member 32 can control the size of the light-passing hole 344 with high precision.

Figure 7:
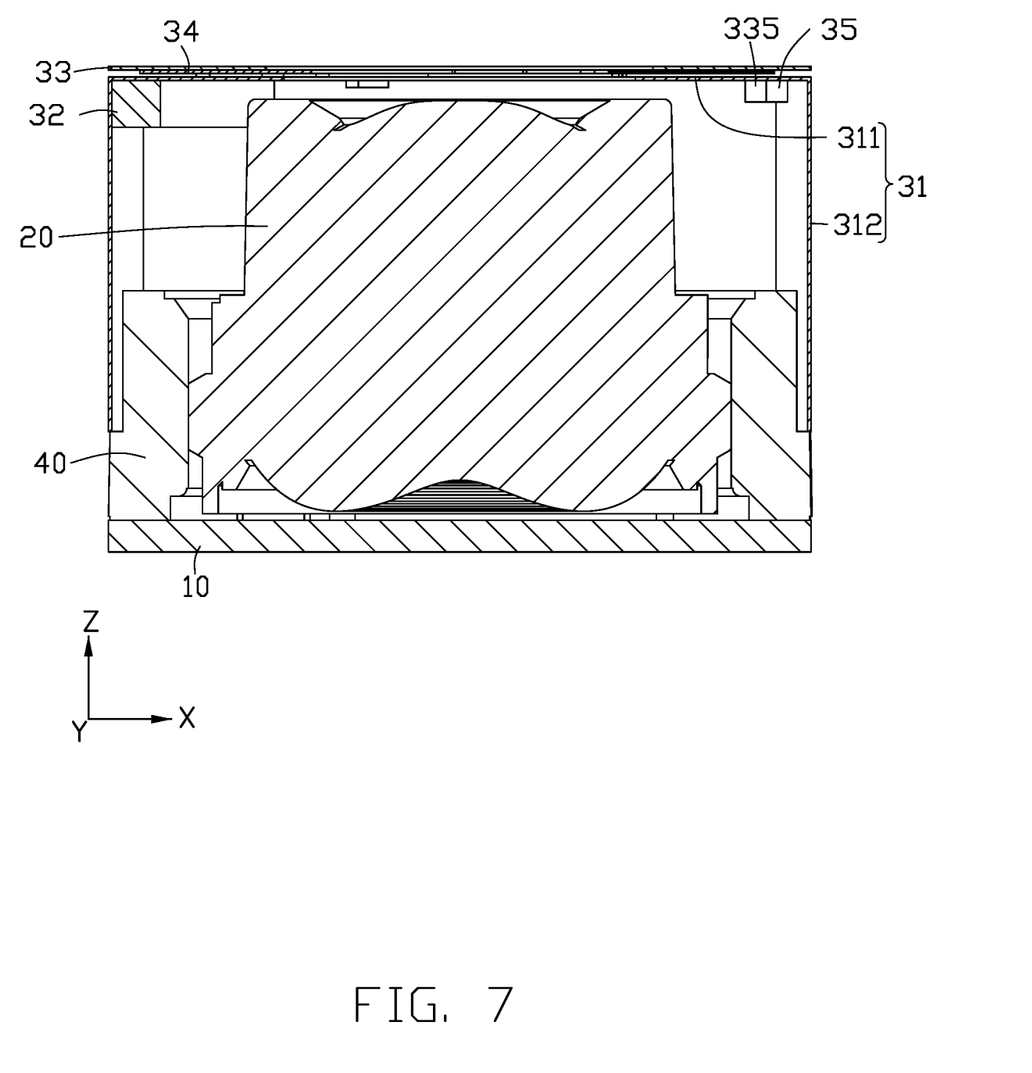
FIG. 7 is a cross-sectional view taken along line VI-VI of FIG. 1.

Referring to FIG. 7, in some embodiments, the lens module 100 further includes a lens holder 40 on which the lens 20 is mounted. The lens holder 40 can be glued on the circuit board 10. The main body 312 is sleeved on the lens 20 and mounted on the top surface of the lens holder 40. When the aperture assembly 30 is installed on the lens holder 40, the dimensions of the lens module 100 in the X direction and Y direction (the X direction and Y direction are each perpendicular to the Z direction of the thickness direction of the lens module 100) do not increase. That is, the setting of the aperture assembly 30 does not increase the size of the lens module 100 in the X direction and Y direction. Compared with the existing driving method in which an electromagnet is used as the driving source, the two piezoelectric blocks 321 used in the present disclosure occupy a small volume. The size increase in the Z direction is only the thickness of the top plate 311, the blades 34, and the rotating disk 33, having little effect on the volume of the lens module 100 and allowing miniaturization of the lens module 100. Since the aperture assembly 30 in the present disclosure can be disposed on the lens 20, there is no need to improve the existing lens 20, the shape of the lens 20 is less important, allowing convenient installation and broad applicability.

When installing the aperture assembly 30, the blades 34 are correspondingly installed on the top plate 311. Then, the top plate 311 is installed on the mounting groove 3113 of the top plate 311 according to the corresponding buckles 333 of the rotating disk 33. Finally, the main body 312 is bonded on the lens holder 40 by glue, to complete the assembly of the lens 20 and the aperture assembly 30. This structure is convenient to install and easy to operate.

Figure 8:
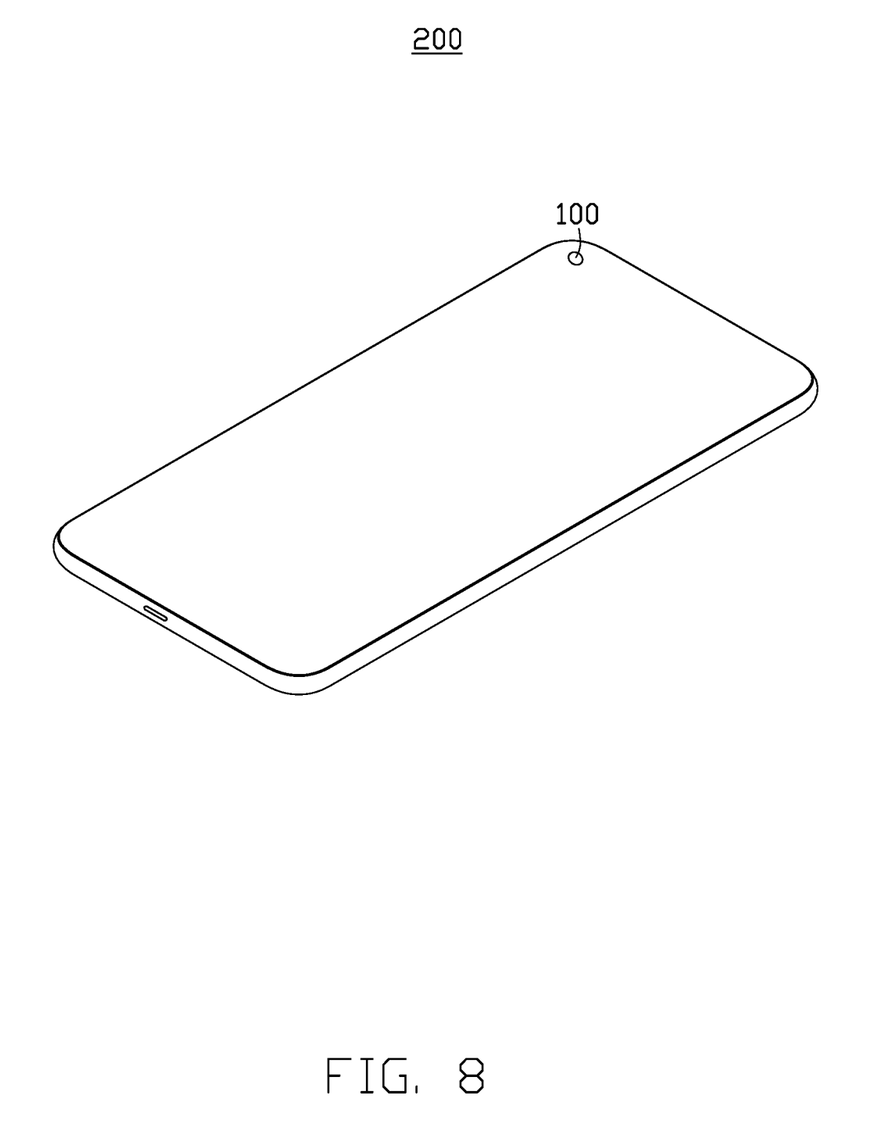
FIG. 8 is a diagrammatic view of an embodiment of an electronic device according to the present disclosure.

Referring to FIG. 8, an electronic device 200 is further provided, and the lens module 100 can be applied to various electronic devices 200 with camera modules, such as mobile phones, wearable devices, vehicles, cameras, or monitoring devices. In the embodiment, the lens module 100 is applied to a mobile phone.

In the present disclosure, the aperture assembly 30 is disposed on the lens 20, the driving member 32 drives the blades 34 to rotate through the rotating disk 33 to adjust the size of the light-passing hole 344 enclosed by the side surfaces 341 of the blades 34, thereby changing the amount of light passing through the lens 20 from the environment. Therefore, the user can arbitrarily adjust the size of the light-passing hole 344 according to desired usage, thereby improving the user experience.

It is to be understood, even though information and advantages of the present embodiments have been set forth in the foregoing description, together with details of the structures and functions of the present embodiments, the disclosure is illustrative only; changes may be made in detail, especially in matters of shape, size, and arrangement of parts within the principles of the present embodiments to the full extent indicated by the plain meaning of the terms in which the appended claims are expressed.

What is claimed is:
1. A lens module comprising:
a lens;
an aperture assembly comprising:
a cover body sleeved outside the lens, the cover body comprising a top plate, and a first light hole defined on the top plate;
a driving member disposed on the cover body;
a rotating disk disposed on the top plate, a second light hole defined on the rotating disk; and
a plurality of blades disposed between the top plate and the rotating disk, the plurality of blades connected to the rotating disk, each of the plurality of blades comprising a side surface, and the side surfaces of the plurality of blades cooperatively defining a light-passing hole;
wherein the first light hole, the second light hole, the light-passing hole, and the lens are coaxial, the driving member is connected to the rotating disk and configured to drive the rotating disk to rotate, the rotating disk is configured to drive the plurality of blades to move closer to or away from each other, so as to adjust an aperture of the lens module;
the driving member comprises two piezoelectric blocks and a movable shaft disposed between the two piezoelectric blocks, the rotating disk is connected to the movable shaft; the two piezoelectric blocks are configured to drive the movable shaft to move, thereby driving the rotating disk to rotate; the driving member further comprises a transmission block disposed on the movable shaft, the transmission block is movably connected to the movable shaft and defines a gap, the driving member further comprises a transmission column disposed on a surface of the rotating disk facing the top plate, and the transmission column is clamped in the gap.

2. The lens module of claim 1, wherein a through hole and a groove are defined on each of the plurality of blades, a plurality of rotating columns are provided on a surface of the top plate facing the blades, a plurality of guiding posts is disposed on the rotating disk; the plurality of guiding posts is accommodated in the groove and configured to move within the groove; each of the groove comprises a first end and a second end opposite to the first end; the aperture of the lens module is at a maximum when the plurality of guiding posts is disposed in the first end; and the aperture of the lens module is at a minimum when the plurality of guiding posts is disposed in the second end.

3. The lens module of claim 1, wherein each of the side surfaces is arc-shaped, the light-passing hole defined by the side surfaces is circular.

4. The lens module of claim 1, wherein the rotating disk comprises a buckle, a mounting groove is defined on the top plate, the buckle is rotatably connected in the mounting groove.

5. The lens module of claim 1, wherein a position detector is disposed on the cover body, a positioning column is disposed on the rotating disk, a positioning groove is defined on the top plate, the positioning column is rotatably connected in the positioning groove; an induction magnet is embedded in the positioning column, the positioning detector is configured to sense a position of the induction magnet, so as to obtain positions of the movable shaft and the transmission block.

6. The lens module of claim 5, further comprising a circuit board, wherein the lens is disposed on the circuit board, and the two piezoelectric blocks and the positioning detector are all electrically connected to the circuit board.

7. The lens module of claim 1, further comprising a lens holder, wherein the lens is mounted on the lens holder, the cover body further comprises a main body, the top plate is disposed on the main body, and the main body is disposed on the lens holder.

8. An electronic device comprising:
    a lens module comprising:
        a lens;
        an aperture assembly comprising:
            a cover body sleeved outside the lens, the cover body comprising a top plate, and a first light hole defined on the top plate;
            a driving member disposed on the cover body;
            a rotating disk disposed on the top plate, a second light hole defined on the rotating disk; and
            a plurality of blades disposed between the top plate and the rotating disk, the plurality of blades connected to the rotating disk, each of the plurality of blades comprising a side surface, and the side surfaces of the plurality of blades cooperatively defining a light-passing hole;
        wherein the first light hole, the second light hole, the light-passing hole, and the lens are coaxial, the driving member is connected to the rotating disk and configured to drive the rotating disk to rotate, the rotating disk is configured to drive the plurality of blades to move closer to or away from each other, so as to adjust an aperture of the lens module;
        the driving member comprises two piezoelectric blocks and a movable shaft disposed between the two piezoelectric blocks, the rotating disk is connected to the movable shaft; the two piezoelectric blocks are configured to drive the movable shaft to move, thereby driving the rotating disk to rotate; the driving member further comprises a transmission block disposed on the movable shaft, the transmission block is movably connected to the movable shaft and defines a gap, the driving member further comprises a transmission column disposed on a surface of the rotating disk facing the top plate, and the transmission column is clamped in the gap.

9. The electronic device of claim 8, wherein a through hole and a groove are defined on each of the plurality of blades, a plurality of rotating columns are provided on a surface of the top plate facing the blades, a plurality of guiding posts is disposed on the rotating disk; the plurality of guiding posts is accommodated in the groove and configured to move within the groove; each of the groove comprises a first end and a second end opposite to the first end; the aperture of the lens module is at a maximum when the plurality of guiding posts is disposed in the first end; and the aperture of the lens module is at a minimum when the plurality of guiding posts is disposed in the second end.

10. The electronic device of claim 8, wherein each of the side surface is arc-shaped, the light-passing hole defined by the side surfaces is circular.

11. The electronic device of claim 8, wherein the rotating disk comprises a buckle, a mounting groove is defined on the top plate, the buckle is rotatably connected in the mounting groove.

12. The electronic device of claim 10, wherein a position detector is disposed on the cover body, a positioning column is disposed on the rotating disk, a positioning groove is defined on the top plate, the positioning column is rotatably connected in the positioning groove; an induction magnet is embedded in the positioning column, the positioning detector is configured to sense a position of the induction magnet, so as to obtain positions of the movable shaft and the transmission block.

13. The electronic device of claim 12, wherein the lens module further comprising a circuit board, the lens is disposed on the circuit board, and the two piezoelectric blocks and the positioning detector are all electrically connected to the circuit board.

14. The electronic device of claim 8, wherein the lens module further comprising a lens holder, the lens is mounted on the lens holder, the cover body further comprises a main body, the top plate is disposed on the main body, and the main body is disposed on the lens holder.

* * * * *